Feb. 12, 1924.
L. C. STUKENBORG
1,483,248
COTTON PICKER
Filed April 14, 1919   3 Sheets-Sheet 1
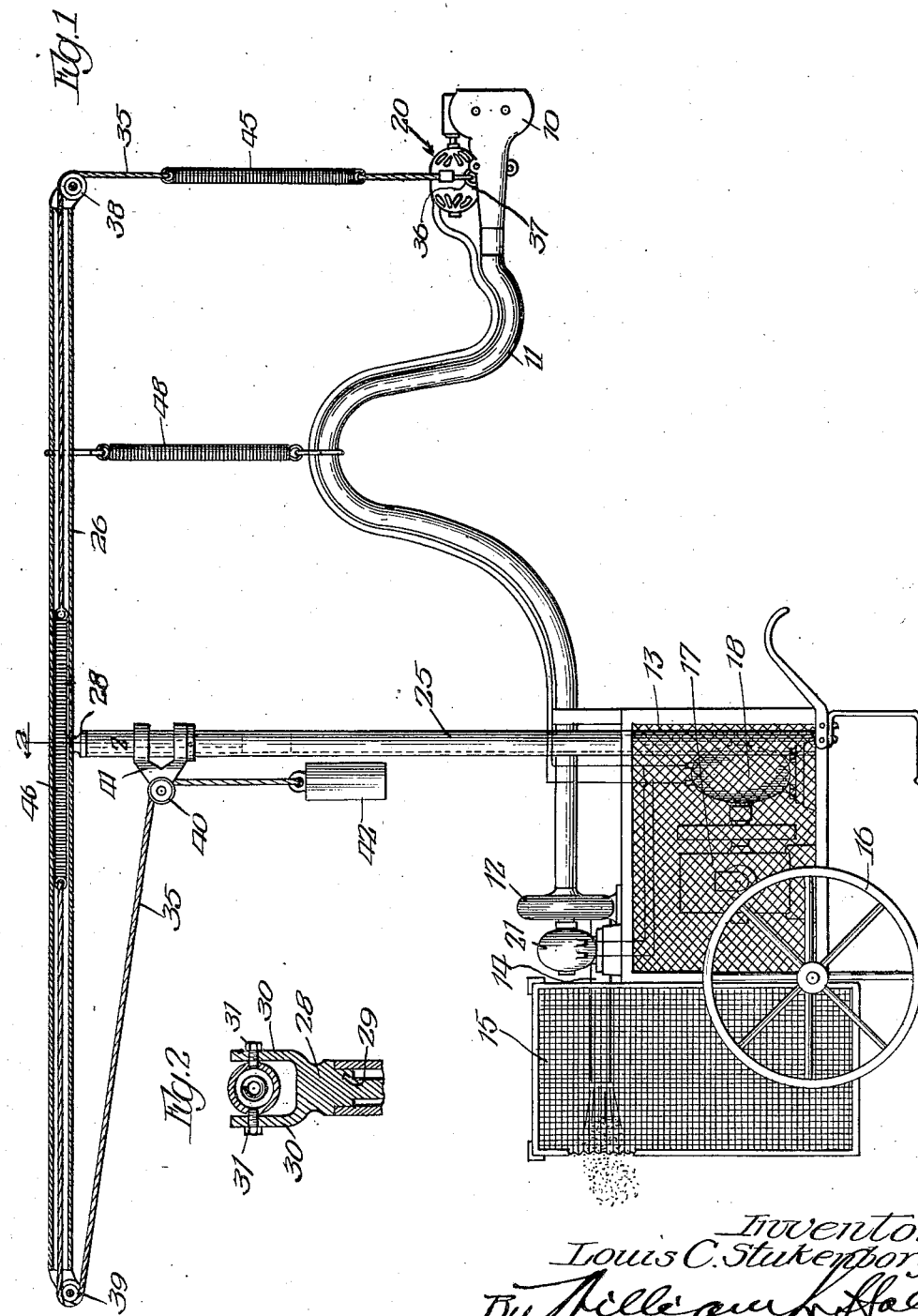
Inventor
Louis C. Stukenborg

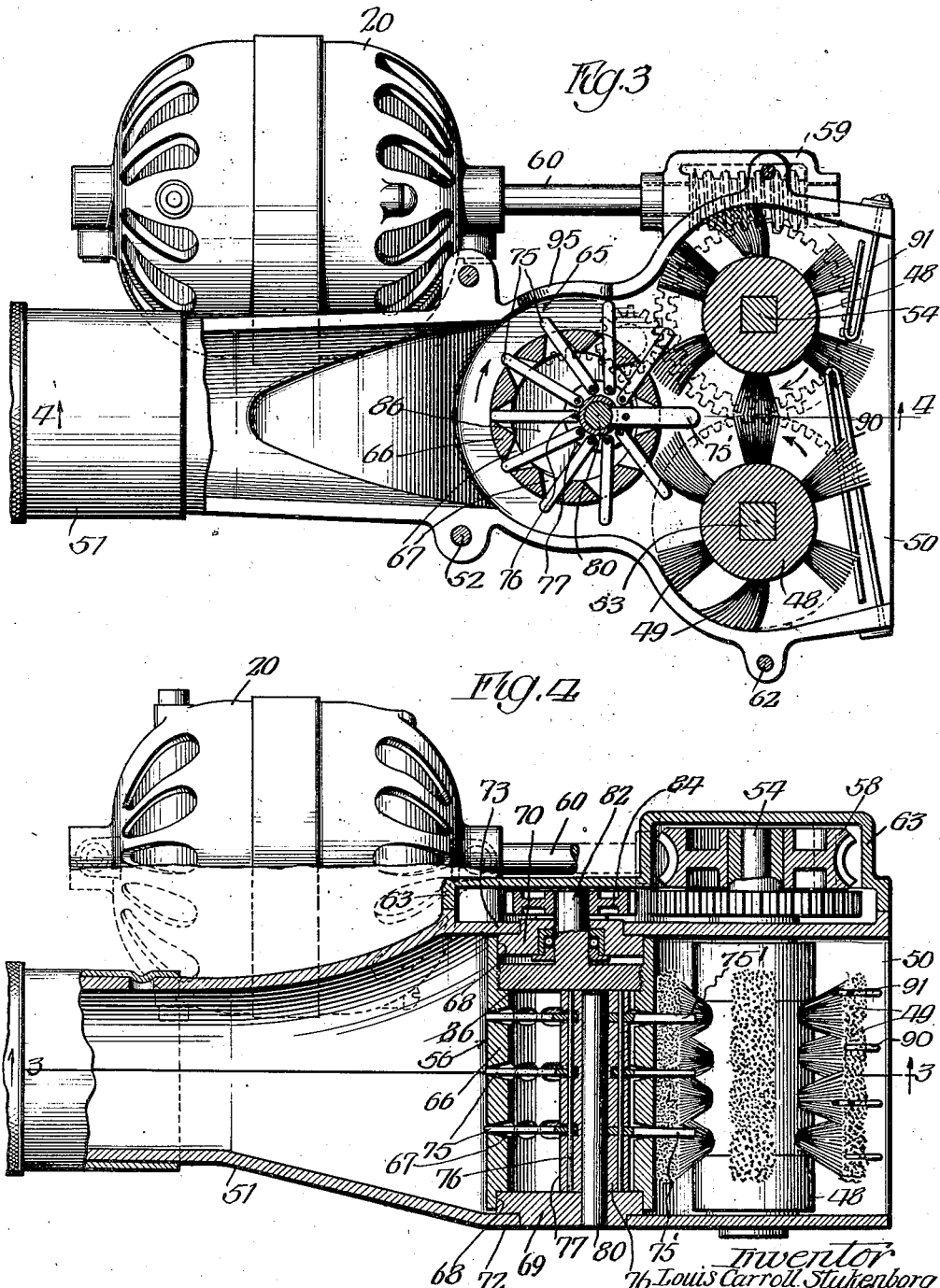

Feb. 12, 1924.  
L. C. STUKENBORG  
COTTON PICKER  
Filed April 14, 1919  
1,483,248  
3 Sheets-Sheet 3
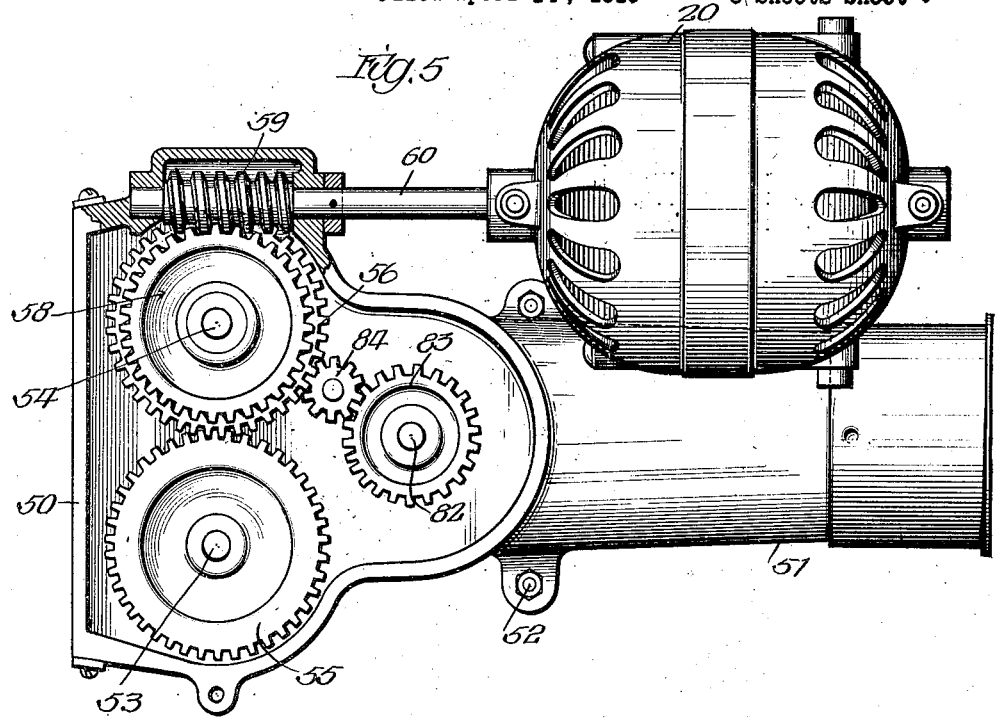
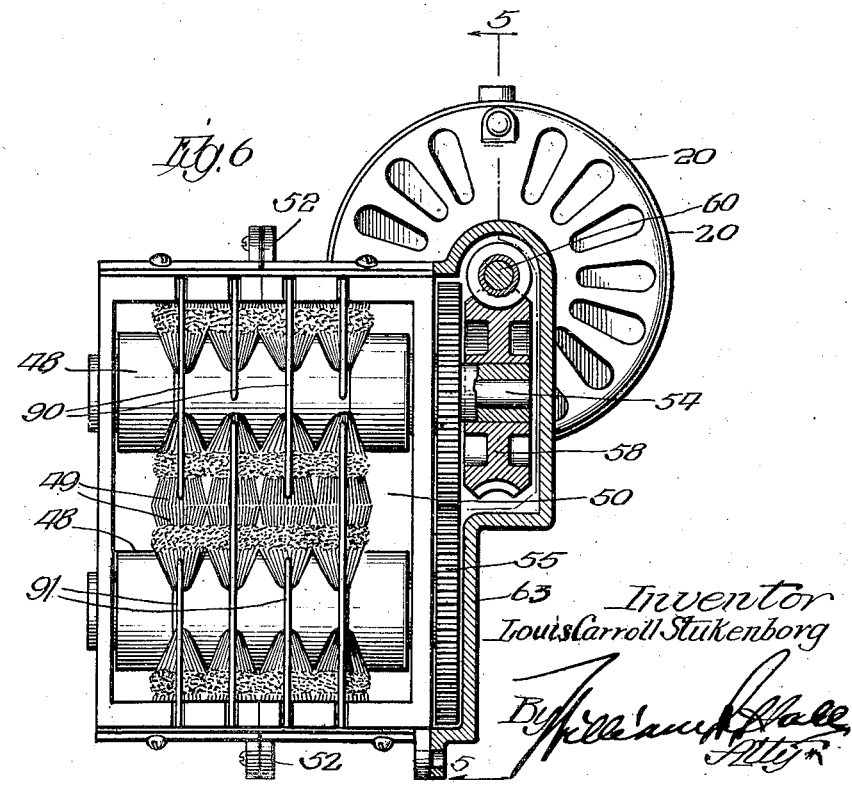
Inventor  
Louis Carroll Stukenborg Patented Feb. 12, 1924.

1,483,248

UNITED STATES PATENT OFFICE.

LOUIS CARROLL STUKENBORG, OF CHICAGO, ILLINOIS, ASSIGNOR TO FREDERICK W. STUKENBORG, OF CHICAGO, ILLINOIS.

COTTON PICKER.

Application filed April 14, 1919. Serial No. 290,032.

*To all whom it may concern:*

Be it known that I, LOUIS CARROLL STUKENBORG, a citizen of the United States, and a resident of Chicago, in the county of Cook and State of Illinois, have invented certain new and useful Improvements in Cotton Pickers; and I do hereby declare that the following is a full, clear, and exact description thereof, reference being had to the accompanying drawings and to the characters of reference marked thereon, which form a part of this specification.

This invention relates to improvements in cotton picking and conveying mechanism, and is herein shown as adaptable to a machine for picking cotton staple directly from the plant bolls, although it may be employed for drawing or picking cotton from bales. The structure herein shown is of that general type of structure illustrated in my prior United States Patent Number 1,264,575, granted on the thirtieth day of April, 1918, and relates to certain improvements for simplifying and improving the mechanism shown in said patent in respect of the picker mechanism, the driving mechanism, and means for counter-balancing the operative parts of the machine.

Among the objects of the invention is to improve the means for driving the picker mechanism of the picker head.

A further object of the invention is to provide improved means, in a cotton picking or conveying mechanism, of counter-balancing the weight of the head which contains the picker mechanism and the conveyor tube by which the cotton is directed rearwardly through said tube from the cotton picker mechanism to a place for the disposal thereof and also the motor when the head carries the motor.

Another object of the invention is to provide an improved arrangement for removing the cotton rearwardly from the picker brushes to deliver the cotton into the area of the moving blast of air maintained through the conveyor tube.

Another object of the invention is to improve the details of the take-off mechanism which removes the cotton from the picker brushes.

A further object of the invention is to provide improved guard means in front of the brushes to prevent entrance to the head of burs and leaf particles.

Other objects of the invention are to improve and simplify cotton handling and conveying mechanism, and the invention consists in the combination and arrangement of the parts shown in the drawings and described in the specification, and is pointed out in the appended claims.

The invention is herein shown as specifically adapted to a cotton picker that is designed to operate in the field for picking the cotton staple from the plant bolls and for directing the same, after the staple has been combed and cleaned, into a receiving receptacle; but it will be understood that certain features of the invention may be employed in mechanism for otherwise handling cotton staple.

As shown in the drawings,

Figure 1 is a side elevation of a cotton picker machine embodying my invention.

Figure 2 is a detail section on line 2—2 of Figure 1.

Figure 3 is a vertical section of the head on the line 3—3 of Figure 4.

Figure 4 is a section on the line 4—4 of Figure 3.

Figure 5 is a section on the line 5—5 of Figure 6.

Figure 6 is a front elevation of the head, showing the gear casing in section.

Referring first to Figure 1 of the drawings, 10 designates the picker head which is connected by a flexible conveyor tube 11 to a suction blower 12 that is suitably supported on a frame designated as a whole by 13. The eduction pipe 14 of said blower may discharge into a basket 15 removably supported on the frame 13 to receive the cotton,—the cotton being discharged from the pipe 14 against the screened or foraminated wall of the basket to effect separation of boll dirt and the like from the cotton staple. The frame 13 may be supported on wheels 16 or on runners, if desired. Said frame carries a motor 17, as an explosion engine, by which to operate the various elements of the picker mechanism. As shown, the said engine is connected to a dynamo 18 on the frame, which latter is connected by suitable circuit wires with a motor 20 on the head and with a motor 21 to drive the blower 12. If desired, a number of suction blowers 12 may be employed to serve a number of heads 10 and their motors supplied by current from a single dynamo 18.

The weight of the head 10, the motor 20 supported thereon, and the conveying tube 11 may be counter-balanced, so as to avoid necessity of the operator carrying said weight by means made as follows:

25 designates a hollow standard that rises from the frame 13 and is supported thereon in any suitable manner. 26 designates a hollow beam that is supported at the upper end of said standard by means permitting it to swing in a horizontal plane and also to swing in a vertical plane on an axis coincident with the vertical axis of the standard 25. As herein shown, this connection is afforded by means of a turntable fitting 28 (Figure 2) that has a downwardly extending portion 29 which projects into and has bearing in the standard 25. It is provided with upstanding, laterally separated arms 30, between which is disposed the central portion of the beam 26, the latter being pivoted to said arms by means of pivot screws or studs 31 that are threaded through the arms and engage bearings in the beam 26. The construction described permits the beam 26 to be rotated in all directions in a horizontal plane, and also to be swung vertically about the axes of the studs 31. The head 10 is supported from the forward end of the beam by means of a cable 35, having a hook 36 at one end to engage in socket 37 on the head. Said cable 35 is trained between its ends over pulleys 38, 39 at the ends of said beam 36 and thence over a pulley 40 mounted in a bracket 41 that is fixed to the standard 25 near the turntable fitting 28, the terminal end of said cable 35 carrying a weight 42 which counter-balances the weight of the picker head, its motor, and the conveyor tube 11.

In order that the head may be delicately poised and manipulated with a minimum force applied to depress it or raise it, the said cable or strand 35 embraces in its length one or more springs 45, 46, the former interposed between the forward end of the beam 26 and the head 10, and the latter located within the hollow beam 26. Preferably also the conveyor tube 11 is supported between its ends from the beam 26 through the agency of an elastic hanger composed of a spiral spring 48 attached at one end to said beam and at its other end to the conveyor tube.

The picker mechanism contained within the head 10 is generally similar to that shown in my aforesaid prior patent in that it embraces interacting rotative brushes 48, located at and operating in the mouth of the head, the differentially length bristles 49 of which cooperate in a manner generally similar to that shown in the construction illustrated in my prior companion application for United States Letters Patent, Serial Number 241,745, filed on the 25th day of June, 1918. The casing embraces, in general, a two-part shell shaped at one end to form an open mouth 50 and at its other end to form a neck 51 for attachment to the tube 11; and the two parts of the shell are fastened together by bolts 52 which extend through lugs at the margins of the shell members, whereby upon removal of the bolts the shell members can be separated for access to the operative parts of the mechanism.

The cores of said brushes are non-rotatively fixed to shafts 53, 54 that are mounted in suitable bearings at the side walls of the shell. Fixed to said shafts 53, 54 at one side of the head are intermeshing gears 55, 56; and fixed on one of the shafts, the shaft 54, as herein shown, is a worm gear 58 that is adapted to mesh with a worm 59 which is fixed to the shaft 60 of the motor 20, which latter is suitably supported on the head. Said worm and gears 59, 58, 55, and 56 are enclosed in a casing 63 removably attached to one side of said head.

Arranged in rear of said picker brushes is a self stripping take-off device, designated as a whole by 65 which functions to strip the cotton therefrom operates on the same general principle as the disappearing type of take-off device illustrated in my aforesaid prior Patent Number 1,264,575. In the present construction, however, structural details of the take-off device are improved, and it rotates on an axis parallel or substantially parallel to the axis of rotation of the brushes, instead of at right angles to said axes, as in the prior construction. The variation of the construction and arrangement shown has advantages over the prior construction in respect of simplification of the means for driving the picker head mechanism in a manner to reduce the parts and weight thereof, and to reduce the driving load, and in respect of the fact that said arrangement herein shown permits of a more natural combing action of the take-off devices against the brush bristles which has a less tendency to retard rotation of the brushes and which, therefore, makes the device easier to drive. The parallel relation of the take-off device to the brush has also the further advantage of securing a longer contact of the take-off pins with the brushes so as to more effectively remove the cotton from the brushes.

The said take-off device embraces a shell 66 provided with a plurality of radial, inwardly tapered openings 67. Said shell is formed at its ends with interior concentric bearings 68 that are supported on peripheral concentric bearings of blocks 69, 70 that are fixed in any suitable manner to the walls 72, 73 of the casing. 75, 75 designate a series of disappearing take-off fingers or pins that loosely extend through the inwardly tapered openings 67 of the shell and are loosely connected at their inner ends to rods 76 which extend longitudinally through a sleeve 77 that rotates on a shaft 80 which extends through the sleeve 77 and is concentric thereto. The inner ends of the pins 75 are seated in annular grooves of the sleeve 77, through which and openings at the inner ends of the pins 75 the rods 76 extend so as to provide a loose pivotal connection for said pins on said sleeve. Said shaft 80 is formed integral with or is fixed to the block 69 on which the sleeve 66 rotates.

The shell 66 is rotated on an axis eccentric to the axis of the shaft 80 through the medium of a shaft 82 driven from the gear wheel 55 through a gear 83 on the shaft 82 and an idler pinion 84 which meshes with the gears 56 and 83 (Figures 3, 4, and 5). Said shaft 82 rotates in a ball bearing in the block 70 and is connected inwardly beyond said bearing to the shell 66 to drive the latter about an axis concentric to the axis of the drive shaft 82. As herein shown, the shaft 82 is enlarged at its inner end to form a head 86 that is made fast to said shell as by screw threads that run in the direction of operative rotation of said shell. Certain of the take-off teeth or fingers, to-wit, those designated by 75', are larger than the teeth 75 and are fixed to the sleeve 77 so as to constitute driving elements by which the sleeve 77 and the series of fingers or teeth are driven. It will thus be observed that the sleeve 77 is positively driven from the shell 66 through the driving pins 75' and that the eccentricity of said sleeve and shell produce the protruding and retreating effect of the pins or fingers before mentioned. The ratio of the brush driving gears to the driving gear 83 for the shell 66 is such that the shell and the series of teeth 75, 75' are driven at a speed considerably greater than that of the brushes, a ratio of two to one being an efficient one.

The air passage through the tube 11 to carry the cotton backwardly passes into the head largely through an opening 95 in the head casing abreast the take-off device 65, a portion of the air, however, entering the head through the mouth thereof.

Arranged in advance of the brushes at the mouth of the head 10 are a series of guards 90, 91 which serve to permit the cotton staple to be drawn inwardly into the head by the brushes while preventing the burs and leaf particles being drawn into the head with the staple. As an improvement in the arrangement of said guards, they are of alternately different lengths, the guards 90 extending across and beyond the center of the mouth, while the guards 91 terminate short of said center. This arrangement has been found to be very efficient in that the entire front of the head is protected in a manner to avoid entrance of burs and leaf particles therein, while permitting free passage of the cotton staple between the guards.

I claim as my invention:

1. A cotton picker comprising interacting picker brushes and a rotative, self-clearing take-off device in contact with, and having its axis parallel to the axes of said brushes.

2. A cotton picker comprising interacting picker brushes and a take-off device in contact with and parallel to said brushes and rotative on an axis parallel to and in a plane between the planes of the axes of rotation of said brushes.

3. A cotton picker comprising oppositely rotative interacting picker brushes and a rotative take-off device, having its axis parallel to the axes of said brushes, embracing a series of fingers adapted to be extended into the bristles of the brushes, and stripper means for said fingers.

4. A cotton picker comprising oppositely rotative interacting picker brushes and a rotative take-off device having its axis parallel to the axes of said brushes, embracing a series of fingers adapted to be extended into the bristles of the brushes, and a rotative stripper shell having perforations through which said fingers are adapted to extend.

5. A cotton picker comprising interacting picker brushes and a rotative take-off device in contact with and having its axis parallel to the axes of said brushes embracing a series of fingers loosely connected to a support and a perforated shell through which said picker fingers are adapted to extend, the axis of rotation of the shell being eccentric to that of the picker finger support.

6. A cotton picker comprising interacting picker brushes and a rotative take-off device in contact with said brushes embracing a perforated shell, fixed bearings which said shell overlaps, a shaft connected to and driving said shell, a second shaft eccentric to the driving shaft and fixed to one of said bearings, and a series of pins loosely supported on a sleeve carried by said second shaft and extending through the perforations of said shell.

7. A cotton picker comprising interacting picker brushes and a rotary take-off device in contact with said brushes, embracing a perforated shell, fixed bearings which said shell overlaps, a driving shaft connected to and driving said shell, one of said bearings being provided with an opening through which said driving shaft extends, a shaft fixed to the other bearing and disposed parallel with an eccentric to said driving shaft, and a series of pins loosely supported on one of said shafts and adapted to be projected through the shell perforations.

8. A cotton picker comprising interacting rotative picker brushes and a rotative take-off device in contact with and parallel to said brushes, embracing a perforated shell, fixed bearings which said shell overlaps, a driving shaft connected to and driving said shell, one of said bearings being provided with an opening in which said driving shaft is mounted, said driving shaft being provided inwardly beyond its bearing with an enlargment fixed to said shell, a shaft fixed with the other bearing and disposed parallel with and eccentric to said driving shaft, and a series of pins loosely supported by one of said shafts and adapted to be projected through the shell perforations.

9. In a cotton picker, a head, rotative, interacting picker brushes in the head, shafts for said brushes extending through and rotatively mounted in bearings in the walls of the head, intermeshing gears connected to corresponding ends of the brush shafts, a take-off device in rear of and in contact with the brushes, with its axis parallel to the axes of the brushes and provided with a drive shaft having a gear at the gear ends of the brush shaft and connected to one of the brush shaft gears by an idler.

10. In a cotton picker, a head, rotative, interacting picker brushes in the head, shafts for said brushes extending through and rotatively mounted in bearings in the walls of the head, intermeshing gears connected to corresponding ends of the brush shafts, a take-off device in rear of and in contact with the brushes, with its axis parallel to the axes of the brushes, and provided with a drive shaft having a gear at the gear ends of the brush shafts, and connected to one of the gears by an idler, and a driving means connected directly to one of said brush shaft gears.

11. In a cotton picker, a head, rotative, interacting picker brushes in the head, shafts for said brushes extending through and rotatively mounted in bearings in the walls of the head, intermeshing gears connected to corresponding ends of the brush shafts, a take-off device in rear of and in contact with the brushes and parallel thereto, and provided with a fixedly connected drive shaft having a gear at the gear ends of the brush shafts, and connected to one of the gears by an idler, one of said brush shafts being provided with a worm gear, and a worm on said driving means meshing with said gear.

12. In a cotton picker, a head, rotative, interacting picker brushes in the head, shafts for said brushes extending through and rotatively mounted in bearings in the walls of the head, intermeshing gears connected to corresponding ends of the brush shafts, a take-off device in rear of and in contact with the brushes with its axis parallel to the axes of the brushes and provided with a drive shaft having a gear at the gear ends of said brush shafts, and connected to one of said brush shaft gears by an idler, and driving means connected directly to one of said brush shafts, said take-off device embracing a perforated shell, a series of pins loosely connected to a support eccentric to the axis of rotation of the shell and adapted to extend through the shell perforations.

13. A cotton picker comprising a frame, a standard supported thereon, a blower mounted on the frame, with means for driving it, a picker head, a flexible conveyor tube connecting the head to said blower, and means for counterbalancing the weight of the tube and head embracing a strand attached at one end to said head and at the other end to a counter-weight and including a contractile spring.

14. A cotton picker comprising a frame, a standard supported thereon, a blower mounted on the frame, with means for driving it, a picker head, a flexible conveyor tube connecting the head to said blower, and means for counterbalancing the weight of the tube and head comprising a hollow beam supported on said standard to turn horizontally and swing vertically, a strand connected at one end to the head and extending through said beam, and a counter-weight attached to the other end of said strand.

15. A cotton picker comprising a frame, a standard supported thereon, a blower mounted on the frame, with means for driving it, a picker head, a flexible conveyor tube connecting the head to said blower, and means for counter-balancing the weight of the tube and head comprising a hollow beam supported on said standard to turn horizontally and swing vertically, a stretchable strand connected at one end to the head and extending through said beam, and a counter-weight attached to the other end of said strand.

16. A cotton picker comprising a frame, a standard supported thereon, a blower mounted on the frame, with means for driving it, a picker head, a flexible conveyor tube connecting the head to said blower, and means for counter-balancing the weight of the tube and head comprising a hollow beam supported on said standard to turn horizontally and swing vertically, pulleys at the ends of said beam, a counter-weight, and a strand attached at one end to said counter-weight and trained about said pulleys and extending through said beam and attached at its other end to said head.

17. A cotton picker comprising a frame, a standard supported thereon, a blower mounted on the frame, with means for driving it, a picker head, a flexible conveyor tube connecting the head to said blower, and means for counter-balancing the weight of the tube and head, comprising a hollow beam supported on the standard to turn horizontally and swing vertically, a counter-weight, a strand attached at one end to said counter-weight and extending through said beam and attached at its other end to said head, and a tensile spring included in said strand.

18. A cotton picker comprising a frame, a standard supported thereon, a blower mounted on the frame, with means for driving it, a picker head, a flexible conveyor tube connecting the head to said blower, and means for counter-balancing the weight of the tube and head comprising a beam supported on the standard to turn horizontally and swing vertically, a counter-weight, a stretchable strand attached at one end to the counter-weight and at the other end to said head, and a spring hanger to support the conveyor tube from said beam.

19. A cotton picker comprising a frame, a standard supported thereon, a blower mounted on the frame, with means for driving it, a picker head, a flexible conveyor tube connecting the head to said blower, means for counter-balancing the weight of the tube and head embracing a stretchable strand directly attached at one end to said head and at the other end to a counter-weight, and a spring hanger to support said tube, intermediate the ends thereof, to a part which supports said strand.

20. A cotton picker comprising rotative brush means and interacting rotative eccentric take-off means whose axis of rotation is parallel to the axis of rotation of the brush means.

21. A cotton picker comprising rotative brush means adapted for initial contact with the cotton to constitute the principal picking element of the picker and rotative take-off means co-acting with the brush means to remove the cotton therefrom and rotative on an axis parallel to the axis of rotation of the brush means.

22. A cotton picker comprising rotative brush means adapted for initial contact with the cotton to constitute the principal picking element of the picker, rotative take-off means co-acting with the brush means to remove the cotton therefrom and rotative on an axis parallel to the axis of rotation of the brush means, and pneumatic means to carry the cotton backwardly from the take-off means including an air inlet in rear of the brush means.

23. In a cotton picker, a head, rotative, interacting picker brushes in the head, shafts for said brushes extending through and rotatively mounted in bearings at the walls of the head, intermeshing gears connected to corresponding ends of the brush shafts, one of the brush shafts being provided with a worm gear, and a driving worm meshing therewith.

24. In a cotton picker, a hollow head, rotative interacting picker brushes in the head, shafts for said brushes extending through and rotatively mounted in bearings at the walls of the head, and driving means for rotating said shafts and thereby the brushes to cause the forward sides of the brushes to move towards each other including a driving shaft having a worm gear meshing with a worm gear on a brush shaft and constituting part of said driving means.

25. In a cotton picker, a hollow head, rotative interacting picker brushes in the head, shafts for said brushes extending through and rotatively mounted in bearings at the walls of the head, driving means for rotating said shafts and thereby the brushes to cause the forward sides of the brushes to move towards each other including a driving shaft having a worm gear meshing with a worm gear on a brush shaft and constituting part of said driving means, and a motor supported on said head for driving said shaft.

In testimony whereof I claim the foregoing as my invention, I hereunto append my signature at Chicago, Illinois, this 12th day of April, 1919.

LOUIS CARROLL STUKENBORG.